United States Patent
D'Amico et al.

(10) Patent No.: US 9,979,956 B1
(45) Date of Patent: May 22, 2018

(54) SHARPNESS AND BLEMISH QUALITY TEST SUBSYSTEM FOR EYECUP ASSEMBLIES OF HEAD MOUNTED DISPLAYS

(71) Applicant: Oculus VR, LLC, Menlo Park, CA (US)

(72) Inventors: Samuel Redmond D'Amico, Irvine, CA (US); Simon Hallam, San Jose, CA (US); Kieran Tobias Levin, Redwood City, CA (US); Matthew Robert Fulghum, Palo Alto, CA (US)

(73) Assignee: Oculus VR, LLC, Menlo Park, CA (US)

( * ) Notice: Subject to any disclaimer, the term of this patent is extended or adjusted under 35 U.S.C. 154(b) by 173 days.

(21) Appl. No.: 15/178,471

(22) Filed: Jun. 9, 2016

(51) Int. Cl.
*H04N 17/00* (2006.01)
*H04N 13/00* (2018.01)
*G06T 7/40* (2017.01)
*G06T 7/00* (2017.01)
*G06T 3/00* (2006.01)

(52) U.S. Cl.
CPC ............ *H04N 17/002* (2013.01); *G06T 3/00* (2013.01); *G06T 7/0081* (2013.01); *G06T 7/408* (2013.01); *G06T 2207/20021* (2013.01); *G06T 2207/30168* (2013.01)

(58) Field of Classification Search
CPC .... H04N 17/002; H04N 17/00; H04N 13/044; H04N 13/00; G06T 3/00; G06T 7/0081; G06T 7/408; G06T 2207/20021; G06T 2207/30168
USPC ............ 348/187, 188, 115, 175, 177; 345/8
See application file for complete search history.

(56) References Cited

U.S. PATENT DOCUMENTS

| | | | |
|---|---|---|---|
| 2009/0040296 A1* | 2/2009 | Moscato | H04N 13/044 348/53 |
| 2016/0341953 A1* | 11/2016 | Tseng | G02B 27/0176 |

\* cited by examiner

*Primary Examiner* — Sherrie Hsia
(74) *Attorney, Agent, or Firm* — Fenwick & West LLP

(57) ABSTRACT

An optical evaluation workstation evaluates quality metrics (e.g., sharpness, blemishes) of eyecup assemblies of a head mounted display (HMD). The workstation includes an eyecup assembly feeder, a camera, and a control module. The eyecup assembly feeder is configured to receive an eyecup assembly of a HMD, the eyecup assembly comprising an optics block rigidly fixed at a first distance to an electronic display panel. The camera is configured to capture one or more images of the one or more test patterns presented by the electronic display panel through the optics block. The control module is configured to modify at least one image of the one or more images using a transform, and determine a quality metric for the modified at least one image.

20 Claims, 6 Drawing Sheets

US 9,979,956 B1

SHARPNESS AND BLEMISH QUALITY TEST SUBSYSTEM FOR EYECUP ASSEMBLIES OF HEAD MOUNTED DISPLAYS

BACKGROUND

The disclosure relates generally to testing optical components, and specifically to systems for performing optical quality assurance tests on eyecup assemblies of head-mounted displays (HMDs).

An HMD includes dual eyecup assemblies. Each eyecup assembly may include an electronic display and various optical elements. After assembly, a user places the HMD such that the user's eye is located at an exit pupil location of the HMD. Due to imperfect manufacturing tolerances, optical quality of an image presented at the exit pupil may not be optimal. For example, optical quality of an image may be affected by a lack of sharpness. Furthermore, optical quality of the image may also be diminished by blemishes on and/or within an electronic display of an eyecup assembly. The assessment of the sharpness of the image produced at the exit pupil, as well as the assessment of the existence of any blemishes at the electronic display is difficult, especially in if the assessment is to be performed quickly in an assembly line setting. Additionally, no standardized test system exists to assess sharpness or the existence of blemishes in the context of HMDs.

SUMMARY

An optical evaluation workstation is designed to simulate the exact environment of a HMD to test for various quality metrics of an eyecup assembly of the HMD. The optical evaluation workstation comprises an eyecup assembly feeder, a camera, and a control model. The eyecup assembly feeder is configured to receive an eyecup assembly of a head mounted display (HMD). The eyecup assembly includes an optics block rigidly fixed at a first distance to an electronic display panel, and the electronic display panel is presenting one or more test patterns. The camera is configured to capture one or more images of the one or more test patterns presented by the electronic display panel through the optics block. The camera is positioned at the exit pupil of the eyecup assembly to simulate the position of a user's eye when using the eyecup assembly in an HMD. The control module is configured to modify at least one image of the one or more images using a transform. The transform may be, e.g., a fast Fourier transform, a blur transform etc. The control module is also configured to determine a quality metric for the modified at least one image.

In one embodiment, one of quality metrics is the sharpness of the image produced by the eyecup assembly. To test this, the control module is further configured to evaluate a sharpness of the one or more images produced by the electronic display panel through the optics block of the eyecup assembly by instructing the electronic display panel to display a sharpness test pattern and determining the sharpness of the sharpness test pattern as captured by the imaging sensor of the camera. To create the sharpness test pattern, the control module instructs the electronic display panel to display a background of one color and one or more parallel lines of a contrasting color traversing the image in a first direction. For example, this might include a white background with vertical and parallel black lines traversing the white background. The control module may also instruct the electronic display panel to display a background of one color and one or more parallel lines of a contrasting color traversing the image in a second direction orthogonal to the first direction. For example, this might include a white background with horizontal and parallel black lines.

The control module also instructs the camera to capture the displayed sharpness test patterns. Once captured, the control module modifies the images using a transform, such as a Fast Fourier Transform (FFT). The control module evaluates the transformed images to determine the sharpness of the images. To do this, the control module determines the sharpness of the captured one or more images based on the frequencies indicated in the FFT transformed one or more images. In particular, a higher indicated frequency indicates a sharper image, and a lower indicated frequency indicates a less sharp image.

The control module may also evaluate for an existence of one or more blemishes on the electronic display panel. These blemishes may be caused by various semi-transparent and opaque foreign materials on the electronic display panel, or a defect in the optics block. To evaluate for these blemishes, the control module instructs the electronic display panel to display one or more blemish test patterns. To do this, the control module may instruct the electronic display panel to display sets of blemish test patterns for each primary color (red, green, and blue). Each blemish test pattern includes evenly distributed regions of lit up pixels with the selected primary color for that set of blemish test patterns. The sum of the regions for each blemish test pattern should be equal to a fraction of the entire size of the electronic display panel. For example, this blemish test pattern may include a serious of dots, which are spread evenly across the image. The control module instructs the camera to capture images of the one or more blemish test patterns using the camera. If multiple test patterns are shown, the control module instructs the camera to capture an image after every test pattern is shown. The control module modifies the captured one or more images using a transform, and evaluates the transformed one or more images to determine an existence of blemishes on the electronic display panel. This transformation may be a blur, and the control module may determine that a blemish exists when more than one of the blurred captured images shows a lower pixel intensity value near the same location for all the captured images.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
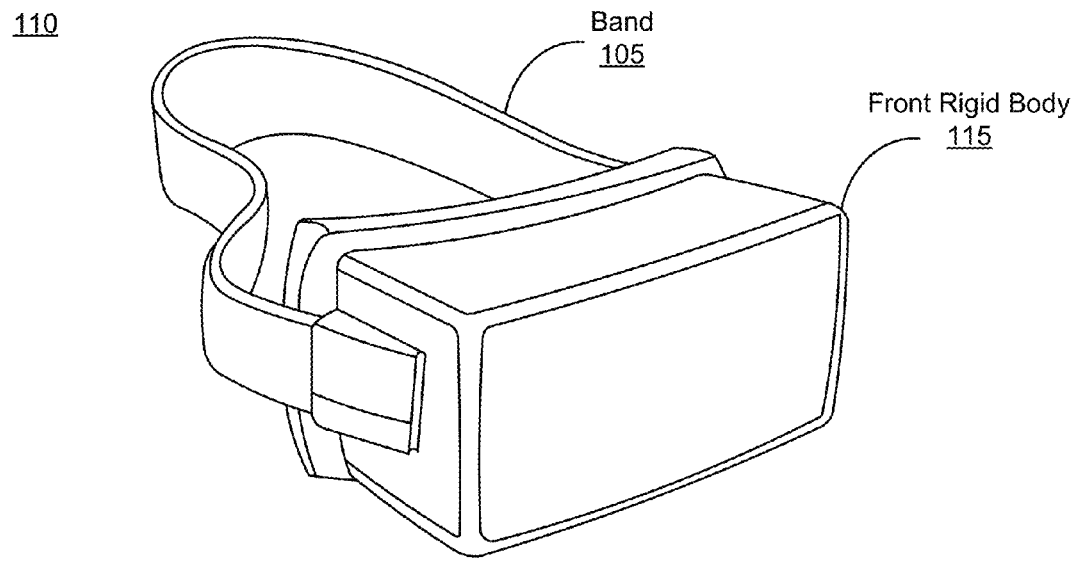
FIG. 1A is a diagram of a HMD, in accordance with an embodiment.

FIG. 1A is a diagram of a HMD 110, in accordance with an embodiment. The HMD 100 is a head-mounted display that presents media to a user. Examples of media presented by the HMD include one or more images, video, audio, or some combination thereof. The media presented to the user may have an interactive element. In some embodiments, audio is presented via an external device (e.g., speakers and/or headphones) that receives audio data based on the audio information. The HMD 100 is generally configured to operate as a VR HMD. However, in some embodiments, the HMD 100 may be modified to also operate as an augmented reality (AR) HMD, a mixed reality (MR) HMD, or some combination thereof. For example, in some embodiments, the HMD 100 may augment views of a physical, real-world environment with computer-generated elements (e.g., images, video, sound, etc.).

The HMD 110 shown in FIG. 1A includes a band 105 and a front rigid body 115. The band 105 is configured for users to wear the HMD on their head. The front rigid body 115 includes one or more optical elements which together display media to users. As discussed below in conjunction with FIG. 1B, the front rigid body 115 includes at least one eyecup assembly for directing image lights to user's eye(s).

Different components of a HMD 110 contribute to quality metrics of the elements inside the HMD. For example, optical elements, display elements, the tolerances of structural elements affixing the optical and display elements, and other components of the HMD may affect the quality metrics of the HMD. A quality metric is a characteristic which indicates how well an element of the HMD meets certain performance requirements. For example, one quality metric is sharpness of the image produced by the HMD. Another quality metric is the existence of blemishes of present in the image produced by the HMD. These quality metrics are discussed below with reference to FIGS. 2-6.

Figure 1B:
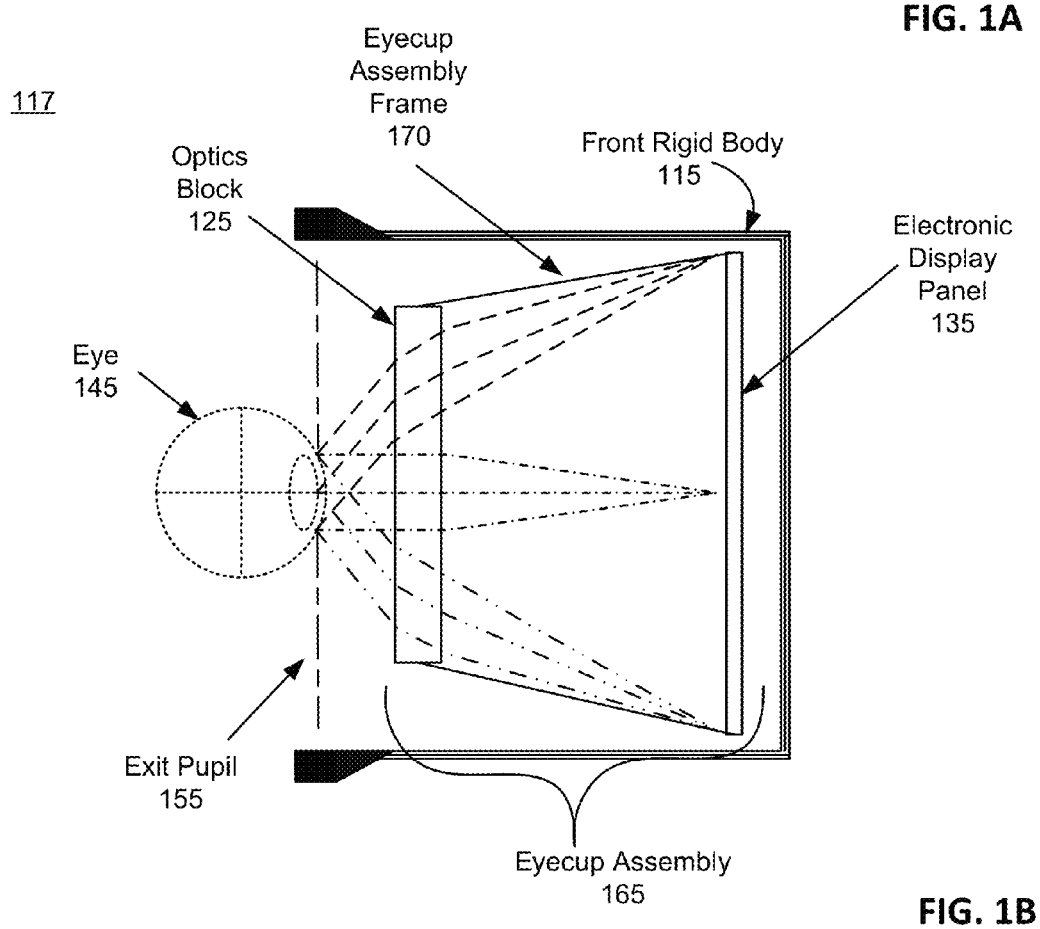
FIG. 1B is a cross section of a front rigid body of the HMD shown in FIG. 1A, in accordance with an embodiment.

FIG. 1B is a cross section 117 of the front rigid body 115 of the HMD 110 shown in FIG. 1A, in accordance with an embodiment. The cross section 117 of the front rigid body 115 includes an eyecup assembly 165. For purposes of illustration, FIG. 1B shows a cross section 117 associated with a single eye 145, but another eyecup assembly, separate from the eyecup assembly 165, provides altered image light to another eye of the user.

The eyecup assembly 165 includes an optics block 125, an eyecup assembly frame 170, and an electronic display panel 135 which together provide image light to an exit pupil 155. The exit pupil 155 is the location where a user's eye 145 is positioned when the user wears the HMD 110.

The electronic display panel 135 is positioned at a first distance from the exit pupil 155 which is the distance between the eye of a user and the image displayed on the display panel 135. The display panel 135 displays images to the user in accordance with data received from the HMD 110, or from another external source. In various embodiments, the electronic display panel 135 may comprise a single electronic display element or multiple electronic display elements (e.g., a display for each eye of a user). Examples of the electronic display panel 135 include: a liquid crystal display (LCD), an organic light emitting diode (OLED) display, an active-matrix organic light-emitting diode display (AMOLED), some other display, or some combination thereof. In one embodiment, due to the type of display panel used for the electronic display panel 135, the electronic display panel 135 includes an uneven distribution of red, green, and blue subpixels. For example, in a PenTile matrix display, the number of green subpixels is double the number of red or blue subpixels.

The optics block 125 is positioned at a second distance from the electronic display panel 135 within the eyecup assembly 165. The optics bock 125 magnifies received image light from the electronic display panel 135 and corrects for some optical errors associated with the image light and the corrected image light is presented to a user of the HMD 110. In various embodiments, the optics block 125 includes one or more optical elements—also referred to as viewing optical elements. Example optical elements included in the optics block 125 include: an aperture, a Fresnel lens, a convex lens, a concave lens, a filter, or any other suitable optical element that affects image light. Moreover, the optics block 125 may include combinations of different optical elements. In some embodiments, one or more of the optical elements in the optics block 125 may have one or more coatings, such as anti-reflective coatings.

The optics block 125 may be designed to correct one or more types of optical errors. Examples of optical errors include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error.

The eyecup assembly frame 170 directs light from the electronic display panel 135 to the optics block 125. The eyecup assembly frame 170 fixes the optics block 125 and electronic display panel 135 relative to each other. The eyecup assembly frame 170 may be composed of, e.g., foam, metal, plastic, some other suitable material that is opaque to visible light, or some combination thereof.

The electronic display panel 135 and the optical elements inside the optics block 125 may both affect the quality metrics. In particular, the sharpness of the image presented to the user by the HMD 110 may be affected by the positions of the optics block 125 and electronic display panel 135 within the HMD 110 and relative to each other. Additionally, the number and location of blemishes on the electronic display panel 135 and/or optical elements within the optics block 125 affects the quality of the image presented to the user by the HMD 110. Due to the potential for the quality of the image produced by the eyecup assembly 165 to be affected negatively, an optical evaluation workstation, such as the one described herein, is developed to test for these quality metrics to ensure that the image produced by each eyecup assembly meets quality metric requirements.

Figure 2:
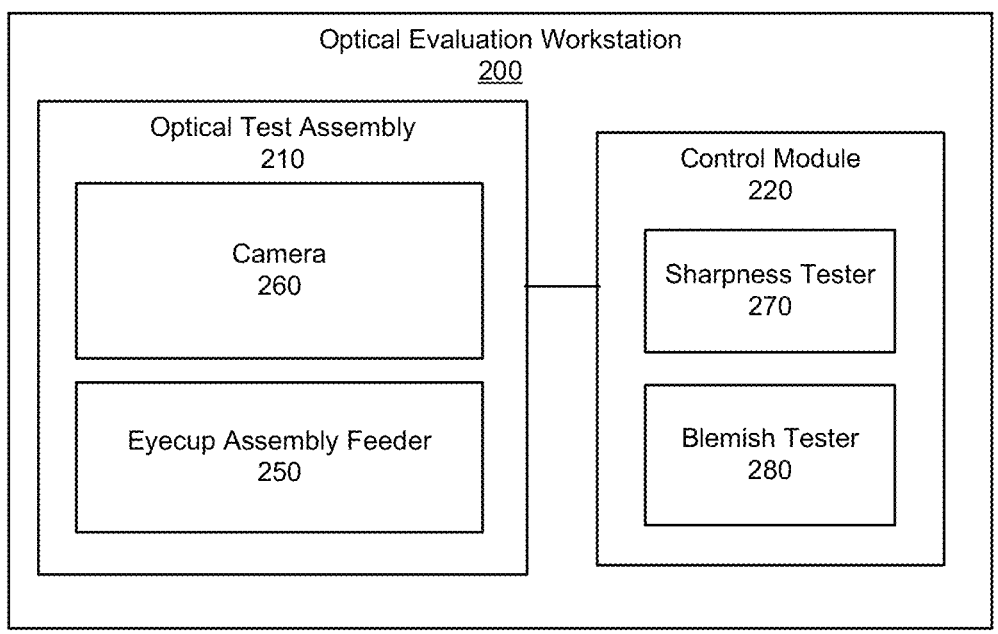
FIG. 2 is a system block diagram of an optical evaluation workstation, in accordance with an embodiment.

FIG. 2 is a system block diagram of an optical evaluation workstation 200, in accordance with an embodiment. Some embodiments of the optical evaluation workstation 200 have different components than those described here. Similarly, the functions can be distributed among the components in a different manner than is described here.

The optical evaluation workstation 200 evaluates one or more quality metrics of an eyecup assembly 165 in an environment designed to replicate the environment inside the HMD 110. As described above, a quality metric is a characteristic which indicates how well an element or elements in the eyecup assembly 165 meets certain performance requirements. Example quality metrics may include spatial resolution, optical contrast, distortion, astigmatism, etc. In particular, the optical evaluation workstation 200 of FIG. 2 may be used to evaluate the sharpness and existence, number, and/or location of blemishes in the image produced by the eyecup assembly 165.

The optical evaluation workstation 200 includes an optical test assembly 210 and a control module 220. The optical test assembly 210 tests quality metrics of the eyecup assembly 165 (e.g., the optics block 125, the electronic display panel 135) inside the HMD 110. In some embodiments, the optical test assembly 210 tests for the sharpness of the image produced by the eyecup assembly 165 of the HMD 110. In some embodiments, the optical test assembly 210 also (or separately) tests for the existence, number, and/or location of blemishes in the image produced by the eyecup assembly 165 of the HMD 110. The optical test assembly 210 includes an eyecup assembly feeder 250 and a camera 260.

The eyecup assembly feeder 250 includes one or more attachment elements that receive and removably attach or hold on to the eyecup assembly 165. In some embodiments, there may be multiple attachment elements that attach to different parts (sub-elements) of the eyecup assembly 165, such as the optics block 125, the eyecup assembly frame 170, or the electronic display panel 135. After the eyecup assembly feeder 250 receives the eyecup assembly 165, the eyecup assembly feeder 250 (or a user) places the eyecup assembly 165 in a test position. A test position is a specific position of the eyecup assembly 165 used to evaluate the eyecup assembly 165 for quality metrics.

The eyecup assembly 165 under test may be placed by the eyecup assembly feeder 250 in a testing position with the camera 260 above the eyecup assembly 165 or to the side of the eyecup assembly 165, respectively. Furthermore, the eyecup assembly 165 may be placed by the eyecup assembly feeder 250 at a position such that an exit pupil of the eyecup assembly 165 aligns with the front of the lens assembly for the camera 260. Once the eyecup assembly feeder 250 places the eyecup assembly 165 in the testing position, it may also couple with the eyecup assembly 165 to provide communications and/or power to the eyecup assembly 165. This coupling may include a data connection for the electronic display panel 135, a power connection for the electronic display panel 135, and so on.

The camera 260 captures images or videos (e.g., of test patterns) produced by an eyecup assembly 165 under test. In particular, the camera 260 captures images produced by the electronic display panel 135 that have passed through the optics block 125. The camera 260 is positioned at the exit pupil of a corresponding eyecup assembly 165 in order to simulate the location of where a user's eye would be located while wearing the HMD 110.

In one embodiment, the camera 260 is also positioned via structural elements (e.g., using countersunk bolts) in the optical evaluation workstation 200 such that it may be translated along an x-y plane that is orthogonal to an axis that passes through the optics block 125 and the electronic display panel 135 of the eyecup assembly 165. This allows the camera 260 to be moved to make minor adjustments to its position, and reduces potential damage to the camera 260 due to an accidental impact. This also fixes the camera 260 such that it remains a certain distance from the eyecup assembly. In some embodiments, the camera 260 may be adjustable in other directions. For example, the camera may be placed on a six-axis stage (i.e., adjustable in x, y, z, pitch, yaw, and roll).

The control module 220 provides instructions to the optical evaluation workstation 200 to execute quality tests to measure various quality metrics of the eyecup assembly 165. In some embodiments, the control module 220 receives a quality test request from a user and then instructs the optical evaluation workstation 200 to receive an eyecup assembly 165 to be tested. The control module can also instruct the camera 260 to capture any images or video produced by the eyecup assembly 165.

In one embodiment, the control module 220 generates a mapping from pixels of the electronic display panel 135 to the pixels of an image sensor of the camera 260, prior to performing any quality tests. This generation of the mapping may be accomplished by instructing the electronic display panel 135 to display various images including sequences of pixels, and instructing the camera 260 to capture these images. By generating the mapping, the control module 220 is able to determine a precise alignment of the electronic display panel 135 relative to the image sensor of the camera 260 and the eyecup assembly 165. The mapping may later be used by the control module 220 to determine an exact position of any defects on the electronic display panel 135, as well as instruct the electronic display panel 135 to display images that have been corrected for various optical errors, such as those described above.

The control module 220 includes a sharpness tester 270 for performing a quality test to measure a quality metric indicating a sharpness of one or more images produced by the eyecup assembly 165 that is undergoing testing.

In one embodiment, the sharpness tester 270 instructs the electronic display panel 135 to display a sharpness test pattern. In one embodiment, the sharpness test pattern includes a background of one color (e.g., white) with one or more lines of a certain thickness (e.g., 5 pixels wide) and contrasting color traversing across the image. These lines may be parallel to each other, and may be displayed at an angle to the vertical (or horizontal) axis, such as 45 degrees. The sharpness tester 270 may instruct the electronic display panel 135 to display multiple sharpness test patterns. In one embodiment, the sharpness tester 270 instructs the electronic display panel 135 to display a sharpness test pattern including parallel vertical lines on a contrasting background, and to display another sharpness test pattern including horizontal vertical lines on a contrasting background. In other words, the lines in one sharpness test pattern are orthogonal to the lines in the other sharpness test pattern.

The sharpness tester 270 instructs the camera 260 to capture one or more images of the various sharpness test patterns. Various examples of captured images of the sharpness test patterns are discussed below with regard to FIG. 4. The sharpness tester 270 modifies the captured images using one or more transforms in order to evaluate the sharpness of the image. In some embodiments, the transform used by the sharpness tester 270 is a Fast Fourier Transform (FFT). The FFT may be a one-dimensional FFT analyzing a single pixel width of data along an axis of the captured image orthogonal to the vertical lines of the captured image. The FFT may be a two dimensional (2D) FFT analyzing the entire captured image. Additional details regarding the FFT transform are discussed with regard to FIG. 4.

The sharpness tester 270 evaluates the transformed images to determine a quality metric indicating the sharpness of the image. In one embodiment, as described above, the transformed image(s) are FFTs of the captured images.

In such a case, the sharpness tester 270 evaluates the sharpness of the image using the FFT. In one embodiment, the sharpness tester 270 determines the frequencies indicated in the FFT to determine the sharpness, with higher frequencies in the FFT result indicating a sharper image.

The sharpness tester 270 may determine the quality metric by assigning a score for each captured image based on the analysis of the FFT. In one embodiment, the score that the sharpness tester 270 assigns is the highest frequency indicated in the FFT. If multiple images are captured and transformed for a single eyecup assembly 165, the sharpness tester 270 may average or otherwise combine the scores from the evaluation of these multiple captured images. For example, if a captured image with vertical lines and a captured image with horizontal lines are transformed using FFT, the sharpness tester 270 may average the scores for both these images into a single combined score.

After evaluating the images, the sharpness tester 270 may generate a report based on the determination of the sharpness of the captured images, and by proxy, the quality metric of the eyecup assembly 165 indicating the sharpness of images produced by the eyecup assembly 165. In some embodiments, the report indicates whether the sharpness score for the eyecup assembly 165 that is being tested is above a threshold value. The threshold value may be determined based on prior quality assurance testing, or may be a cutoff score separating a percentage of eyecup assemblies with the best scores (indicating the highest sharpness).

The report may then be provided by the sharpness tester 270 to a user, to a log, or other component. In some embodiments, if the eyecup assembly 165 has a score that falls below the threshold score for sharpness, the affected eyecup assembly 165 may be removed from the assembly process and the sharpness tester 270 may instruct the eyecup assembly feeder 250 to place the affected eyecup assembly 165 in a separate holding area.

The control module 220 includes a blemish tester 280 that performs a quality test to measure a quality metric. In this embodiment, the quality metric indicates an existence, a number, a location, or some combination thereof, of blemishes in images produced by the eyecup assembly 165 that is being tested (i.e., that is placed by the eyecup assembly feeder 250 in front of the camera 260). These blemishes may exist due to problems with the electronic display panel 135 (e.g., foreign materials on the display panel, defective pixels), or with the optics block 125 (e.g., lens defect, lens damage).

In one embodiment, the blemish tester 280 instructs the electronic display panel 135 to display a blemish test pattern. The blemish test pattern, after being captured by the camera 260 and transformed, may be used to determine whether a blemish exists in the image produced by the eyecup assembly 165. The blemish test pattern may include a plurality of small regions of a single color evenly spaced against a dark (e.g., black) background. The single color may be a color of a sub-pixel (e.g., red, green, blue, or some other color) of the electronic display panel 135. Each small region may be a single sub-pixel, a single pixel, a group of sub-pixels, or a group of pixels. In one embodiment, the total number of pixels lit up for the blemish test pattern is 1/32 of the total number of pixels available for the blemish test pattern. The blemish tester 280 may determine this subdivision value (e.g., 1/32) based on the subpixel addressing of the panel (e.g., for some electronic display panels some pixel locations do not include subpixels of all the colors).

In one embodiment, the blemish tester 280 instructs the electronic display panel 135 to display multiple blemish test patterns sequentially. Each blemish test pattern of the multiple blemish test patterns has a different set of equally spaced pixels of a single color, such that the combination of all the blemish test patterns for that single color light every available pixel in the electronic display panel 135. The blemish tester 280 also instructs the electronic display panel 135 to display a set of these blemish test patterns for each single color (e.g., red, green, and blue). The purpose of displaying each color separately is to avoid the effects of chromatic aberration. In particular, to avoid chromatic aberration, each single color used should comprise a narrow range of wavelengths. Additionally, since the blemish tester 280 does not instruct the electronic display panel 135 to light up a portion of the entire panel, the image generated by the electronic display panel 135 and passing through the optics block 125 does not generate as much glare as lighting up the entire panel.

In some cases the electronic display panel 135 does not equally divide the colors of each sub-pixel among the pixels of the electronic display panel 135. In such a case, if the blemish test pattern uses a color that is not available in a certain pixel location on the electronic display panel 135, that color would not be displayed by the electronic display panel 135. Due to this, the blemish tester 280 may instruct the electronic display panel 135 to display an alternate set of blemish test patterns such that an equal distribution of regions is still displayed for every color. For example, in the case of a PenTile display, the blemish tester 280 may instruct the electronic display panel 135 to display 1/16th of the green subpixels for each green blemish test pattern and 1/32nd of the red or blue subpixels for each red or blue blemish test pattern.

The blemish tester 280 subsequently instructs the camera 260 to take one or more images of the multiple blemish test patterns. Various examples of captured images of blemish test patterns are discussed below with regard to FIG. 5.

The blemish tester 280 modifies the captured images of the blemish test patterns using a transform in order to evaluate for the existence and/or number of blemishes. In one embodiment, the transform includes a blur. The blemish tester 280 may blur the image using any type of blurring algorithm, such as Gaussian blur, box blur, or optical blur by adjusting the focus of the lens assembly of the camera 260. The parameters of the blur may be set such that blurring the captured image results in a certain percentage of the image (e.g., 80%) being covered by blurred pixels (obscuring the background). An example of such a blur is discussed below with regard to FIG. 5.

After modifying the images, the blemish tester 280 evaluates the transformed images for the quality metric to determine the existence, location, and/or number of blemishes indicated by the transformed images. To evaluate the transformed images, the blemish tester 280 determines whether any of the transformed images have areas where the intensity of the pixels are below a certain threshold (i.e., are darker). This threshold may be an average pixel intensity value of the entire image, the pixel intensity value of surrounding pixels, or some other predetermined threshold value, such as 80% or less of peak intensity, or the peak intensity value of the image. The locations of these areas may be locations where a blemish exists.

The blemish tester 280 further confirms the existence of a blemish at a location if multiple transformed images show a darker region at or near (i.e., within a range of) the same location. One advantage of evaluating for the existence of a blemish using a blurred image is that the blurred image may be able to be used to detect blemishes that are not completely opaque or otherwise completely block the transmission of light from the electronic display panel 135 (e.g., thin objects such as human hair, semi-transparent objects, small dust particles, etc.).

The number of images that show a dark area at a location before the blemish tester 280 determines that a blemish exists at that location may be set at a particular threshold that is determined via experimental testing. For example, prior knowledge may be gathered to determine how many images should be captured for different types of blemishes. The number of images used to determine the threshold may correspond to the number of captured images used to detect the type of blemish that uses the largest number of images. Furthermore, the blemish tester 280 may determine that a blemish exists at a location if captured images of blemish test patterns with more than one color (e.g., red and green) all show a darker region at or near the location. In some embodiments, the blemish tester 280 also generates for, each blemish, a score associated with that blemish. The blemish score indicates how the blemish affects the quality of images produced by the eyecup assembly 165. For example, the blemish tester 280 may instruct the electronic display panel 135 to display a series of images and these images may be compared to reference images to determine whether a difference in pixel location and pixel intensity exist. These differences may be combined by the blemish tester 280 to determine the blemish score. The blemish score may also be based on how much a blemish darkens the transformed image at the blemish location. The blemish tester 280 may score the blemishes based on how much of the screen they obscure, both in terms of how many pixels they cover as well as if they are limited to just one color channel or multiple color channels. For example, a blemish that covers more of the screen, or affects more than one color channel, may be scored higher.

In one embodiment, the blemish tester 280 may also use a Fast Fourier Transform (FFT) on the captured test images to determine whether any muras exist. A mura may be an irregular lightness variation on the electronic display panel. By performing an FFT on the captured test images, the blemish tester 280 may be able to determine the locations of mura defects on the electronic display panel.

In some embodiments, the blemish tester 280 generates a report based on the determination of the existence of blemishes. The report indicates the quality metric of the eyecup assembly 165 indicating any blemishes within the eyecup assembly 165. The report may indicate existence, number, a location, blemish score, some other information related to a blemish, or some combination thereof, of one or more blemishes within the eyecup assembly 165. In one embodiment, the actual physical location of the blemish may be determined using the mapping generated previously by the control module 220 as described above, and may be indicated using coordinates. Furthermore, the blemish tester 280 may indicate in the report whether the number of blemishes exceeds a threshold value (e.g., one blemish), and may indicate a score for each blemish as described above.

The report may be provided by the blemish tester 280 to a user or log. In one embodiment, if the eyecup assembly 165 has a score that falls below the threshold score for the number of blemishes, or the scores for each blemish or a single blemish exceeds a threshold score, the affected eyecup assembly 165 may be removed from the assembly process and the blemish tester 280 may instruct the eyecup assembly feeder 250 to place the affected eyecup assembly 165 in a separate holding area.

After the quality tests are completed, the control module 220 can instruct the eyecup assembly feeder 250 to remove or replace the eyecup assembly 165 currently being tested with another eyecup assembly.

Figure 3:
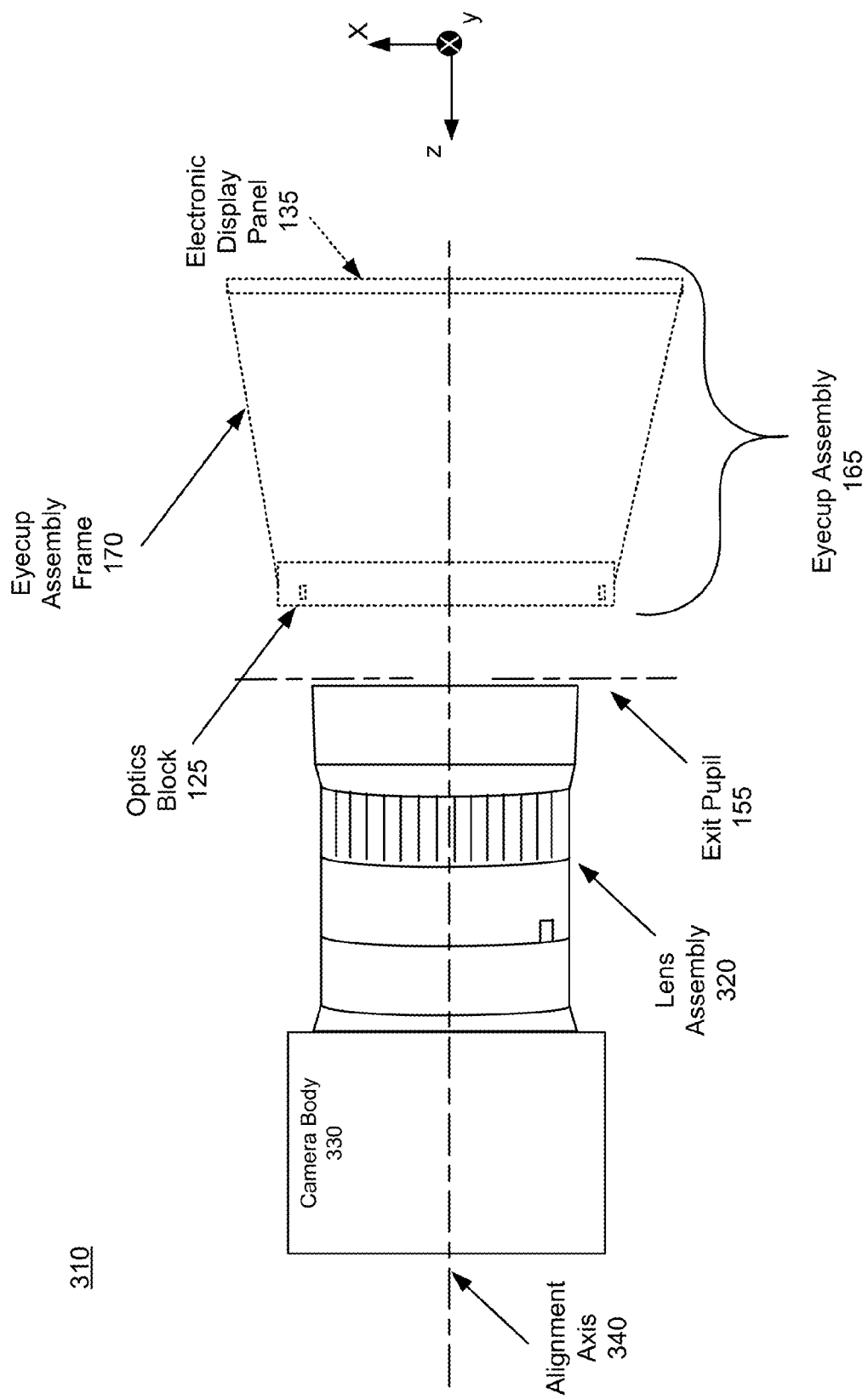
FIG. 3 illustrates components of an exemplary eyecup test assembly for eyecup assemblies, in accordance with according to an embodiment.

FIG. 3 illustrates components of an exemplary eyecup test assembly 310 for eyecup assemblies according to an embodiment. Some embodiments of the eyecup test assembly 310 have different components than those described here. Similarly, the functions can be distributed among the components in a different manner than is described here. In some embodiments, the eyecup test assembly 310 is an embodiment of the optical test assembly 210 shown in FIG. 2. The optical test assembly 310 includes a camera body 330, and a lens assembly 320. The optical test assembly 310 evaluates an eyecup assembly 165 under test.

The camera body 330 of the eyecup test assembly 310 is part of the camera 260. The camera body 330 includes an image sensor to capture images as well as other control circuitry and other components of a camera. In one embodiment, the camera body 330 is a digital single-lens reflex camera, however, in other embodiments, the camera body 330 may be another type of imaging device, such as a digital video recorder, a mirrorless camera, etc. In some embodiments, the camera body 330 may be configured to be able to be coupled to different lens assemblies. In another embodiment, the camera body 330 may be fixed to a lens assembly that cannot be removed.

The lens assembly 320 is coupled to the camera 260. The lens assembly 320 gathers light from an aperture opposite the side of the lens assembly 320 that is attached to the camera body 330, and directs this light to the image sensor of the camera body 330. In one embodiment, the lens assembly 320 is a telephoto lens with a macro lens attachment. In some embodiments, the lens assembly 320 is placed at an exit pupil location of the eyecup assembly 165 such that it is at a position in front of the eyecup assembly 165 corresponding to a position of a human eye relative to the eyecup assembly 165 when a user wears the HMD 110 that includes the eyecup assembly 165. In other embodiments, the lens assembly 320 may be placed at other locations relative to the eyecup assembly 165. In one embodiment, the F-stop of the lens assembly 320 is set such that objects outside the focal plane of the lens assembly 320 do not appear in focus when images of light from those objects are captured through the lens assembly 320.

The lens assembly 320 may be positioned along an alignment axis 340 to minimize light entering the lens assembly 320 that was not generated by the eyecup assembly 165. This may be achieved by a structural feature of the eyecup assembly itself (e.g., a molding that circumscribes the aperture of the lens assembly 320) or via an external structural element that blocks external light sources from transmitting light to the system.

Figure 4:
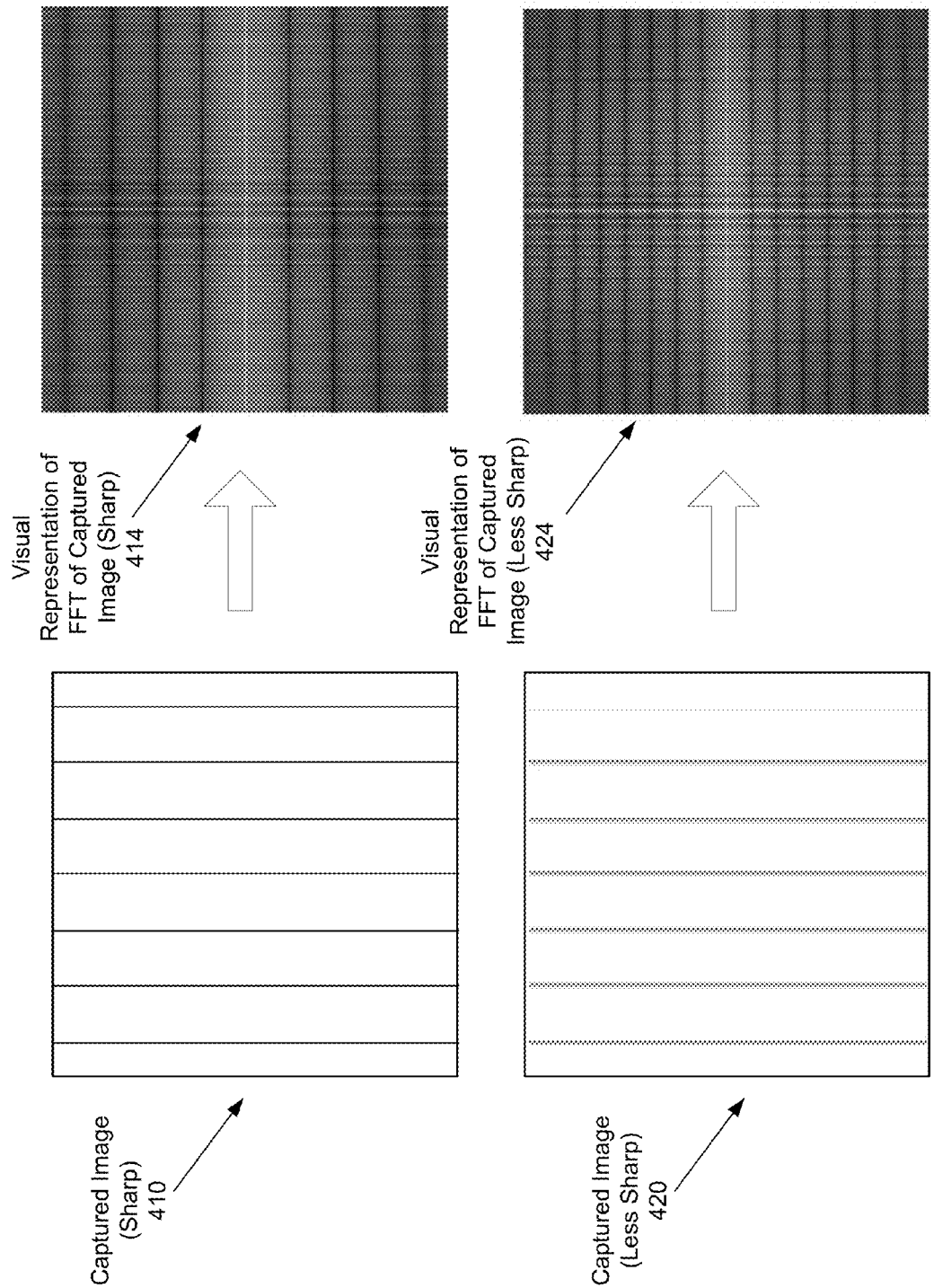
FIG. 4 illustrates various examples of captured images for evaluating sharpness of images produced by the eyecup assembly, in accordance with an embodiment.

FIG. 4 illustrates examples of captured images of sharpness test patterns and representations of FFTs of the captured images, according to an embodiment. Depending on the construction of the eyecup assembly 165, the image that is captured may vary in sharpness. For example, the captured image 410 in FIG. 4 is sharper than the captured image 420. Although only captured images with vertical lines are shown in FIG. 4, as noted above the sharpness tester 270 may instruct the electronic display panel 135 to display sharpness test patterns with horizontal lines or other patterns, and the sharpness tester 270 also instructs the camera 260 to capture images of these test patterns as well. Additionally, the thickness and number of lines in the sharpness test pattern may vary in other embodiments.

Two visual representations of 2D FFTs are also shown in FIG. 4 for the captured images 410 and 420. In particular, the visual representation 415 is a visual representation of a 2D FFT of captured image 410, and the visual representation 425 is a visual representation of a 2D FFT of captured image 420. Although the sharpness tester 270 modifies the images using FFT transforms as shown here, the sharpness tester 270 uses other methods in other embodiments. For example, the sharpness tester 270 may use an edge detection transform (e.g., via a kernel), a contrast detection of features in the captured images, a computation of the variance of the pixel values in the image (with a large variance indicating more sharpness), and so on. As illustrated in FIG. 4, the visual representation 415 that is a 2D FFT of the sharper captured image 410 indicates higher frequencies compared to the visual representation 425 of the less sharp captured image 420.

Figure 5:
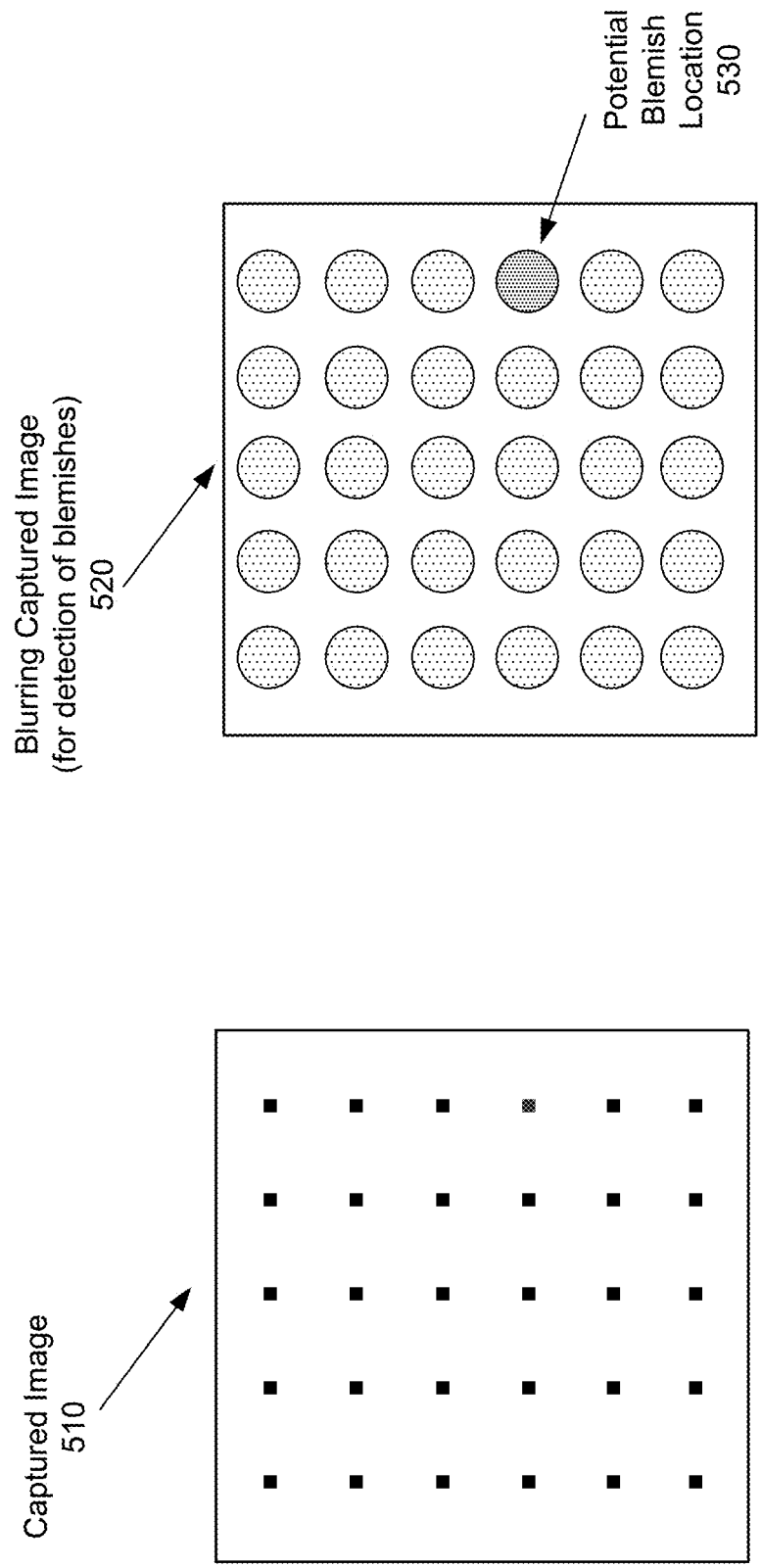
FIG. 5 illustrates various examples of captured images for evaluating the existence of blemishes in images produced by the eyecup assembly, in accordance with an embodiment.

FIG. 5 illustrates an example of a captured image of an exemplary blemish test pattern and a transform of the captured image using a blur, according to an embodiment. Although the illustration shown in FIG. 5 is in black and white, in practice the electronic display panel 135 generates a color image, although the image may later be converted to greyscale after being captured. The captured image 510 illustrated in FIG. 5 includes a pattern of dots. These dots are the regions of the single color of a blemish test pattern described above. As noted, multiple versions of these blemish test patterns may be generated and captured, with each version having a different set of pixels lit up. Thus, in another captured image of another blemish test pattern, the dots that are captured are in different regions, and thus may be shifted vertically or horizontally. Although the exemplary captured image 510 shows a captured blemish test pattern with a specific number of lit up regions, in other embodiments the pattern may include a different number or size of lit up regions.

An illustration of a blur transform is also illustrated in FIG. 5. The blurred captured image 520 is the result of applying a blur transform to the captured image 510. Note that although the blur is represented using circles with interior patterns to aid in the reproduction of the image, the actual blur transform creates a blurred captured image 520 that results in an actual blurring of the captured image 510. The blemish tester 280 may apply the same blur transform to each of the captured images.

The blurred captured image 520 illustrates a potential blemish location 530, represented here as a circle with a darker pattern, within the blurred captured image 520. In practice, the darker location may not appear as shown in the example in FIG. 5, and may be offset from the position shown in FIG. 5, and also may not appear in the shape as shown in FIG. 5.

Figure 6:
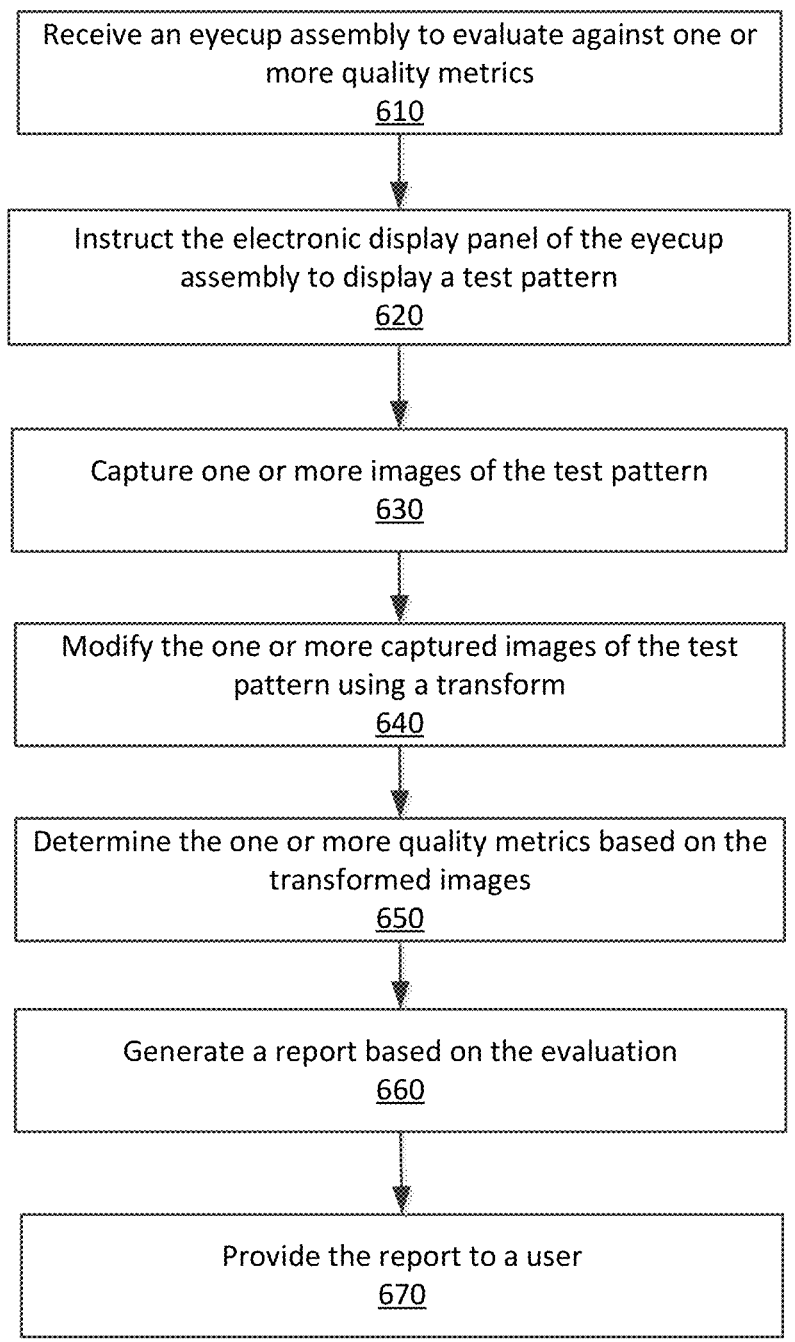
FIG. 6 is a flow chart illustrating a process for determining a quality metric for an eyecup assembly of an HMD, in accordance with an embodiment.

FIG. 6 is a flow chart illustrating a process 600 for determining a quality metric for an eyecup assembly (e.g., an eyecup assembly 165) of an HMD (e.g., HMD 110), in accordance with one embodiment. The process of FIG. 6 may be performed by the optical evaluation workstation 200. Other entities may perform some or all of the steps of the process in other embodiments. Likewise, embodiments may include different and/or additional steps, or perform the steps in different orders.

The optical evaluation workstation 200 receives 610 an eyecup assembly to be tested and evaluated against one or more quality metrics. For example, the optical evaluation workstation 200 can receive from a user an eyecup assembly in a structural element of the optical evaluation workstation 200. The optical evaluation workstation 200 places the received eyecup assembly in a testing position. The testing position simulates the position of the eyecup assembly in an HMD as described above. As another example, the optical evaluation workstation 200 automatically retrieves a new eyecup assembly and places it in the structural element of the optical evaluation workstation 200 for testing.

The optical evaluation workstation 200 instructs 620 an electronic display panel (e.g., electronic display panel 135) of the eyecup assembly being tested to display one or more test patterns, such as a sharpness test pattern, or one or more blemish test patterns.

For example, a sharpness test pattern may include a test pattern with parallel vertical lines against a contrasting background and a test pattern with parallel horizontal lines against a contrasting background.

As another example, the blemish test patterns may include a test pattern that lights up a certain percentage of the pixels of a single color in the electronic display panel, with the lit pixels evenly distributed across different areas of the electronic display panel. Various blemish test patterns lighting up different portions of the electronic display panel may be used, with a set of blemish test patterns having patterns that when combined light up every pixel of the electronic test panel in the single color. Additional sets of blemish test patterns may be used for other colors (e.g., red, green blue).

In one embodiment, prior to instructing the electronic display panel to display the test pattern(s), the optical evaluation workstation 200 determines a mapping between the pixels of the imaging sensor of the camera of the optical evaluation workstation 200 and the pixels of the electronic display panel.

The optical evaluation workstation 200 captures 630 one or more images of the test pattern as produced by the eyecup assembly being tested. For example, the optical evaluation workstation 200 may capture the images with a camera in quick succession as it simultaneously instructs the electronic display panel to display each test pattern. The images are captured such that the test pattern is imaged through an optics block of the eyecup assembly.

The optical evaluation workstation 200 modifies 640 the captured images using a transform. For example, the transform may be an FFT of the image (when the captured image is of a sharpness test pattern). An FFT of an image that indicates higher frequencies indicates that the original image has sharper image features. As another example, the transform may be a blurring of the image (when the captured image is of a blemish test pattern). The transform may be applied to all captured images.

The optical evaluation workstation 200 determines 650 the one or more quality metrics based on the transformed images. The quality metric may indicate the sharpness of the image. The quality metric may also indicate the existence of blemishes in the image, and may also indicate the number and location of blemishes. For example, if the transformed images were transformed using an FFT to test for the sharpness of the image, the optical evaluation workstation 200 determines the frequencies indicated in the FFT and may provide a score based on the frequencies in the FFT. The score may correspond to the highest frequency in the FFT. As another example, if the images are transformed using a blur, the optical evaluation workstation 200 determines whether any of the blurred locations in the image have a lower intensity. If the optical evaluation workstation 200 confirms that this lowered intensity exists over multiple transformed images, then the optical evaluation workstation 200 may determine that a blemish exists at that location.

The optical evaluation workstation 200 may further determine a score for the quality metric based on the number of blemishes or the decrease in intensity caused by the blemish(es). If the score for the quality metric is below a certain threshold, the optical evaluation workstation 200 may further indicate that the eyecup assembly is defective and mark it for rejection.

The optical evaluation workstation 200 generates 660 a test report based on the evaluation. The test report may, e.g., indicate the eyecup assembly does/does not meet the quality metric. The optical evaluation workstation 200 presents 670 the test report to a user. In the case of a quality test for blemishes, the test report may include the location of each blemish and an adjusted version of the each location based on the mapping generated by the optical evaluation workstation 200 as described previously.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical evaluation workstation comprising:
   an eyecup assembly feeder configured to receive an eyecup assembly of a head mounted display (HMD), the eyecup assembly comprising an optics block rigidly fixed at a first distance to an electronic display panel, and the electronic display panel is presenting one or more test patterns;
   a camera configured to capture one or more images of the one or more test patterns presented by the electronic display panel through the optics block, the camera positioned at an exit pupil of the eyecup assembly; and
   a control module configured to:
      modify at least one image of the one or more images using a transform, and
      determine a quality metric for the modified at least one image.

2. The optical evaluation workstation of claim 1, wherein the quality metric is measure of sharpness of the one or more images presented by the electronic display panel, the one or more test patterns includes a sharpness test pattern, the transform is a fast Fourier transform (FFT), and the control module is further configured to:
   determine a sharpness of the at least one image based on frequencies indicated in the one or more images modified using the FFT.

3. The optical evaluation workstation of claim 2, wherein the sharpness test pattern includes a background of a background color and a plurality of parallel lines of a color different than the background color, the plurality of lines traversing the image in a first direction.

4. The optical evaluation workstation of claim 1, wherein the quality metric is a measure of blemishes present in the one or more images, the one or more test patterns are blemish test patterns, and the control module is further configured to:
   determine the existence of one or more blemishes on the electronic display panel based on an analysis of one or more blemish test patterns captured by the imaging sensor of the camera.

5. The optical evaluation workstation of claim 4, wherein the one or more blemish test patterns include a first blemish test pattern that comprises a plurality of evenly distributed regions of a first color separated by a dark background, the total area of the regions in the first blemish test pattern equal to a fraction of the total area of the electronic display panel.

6. The optical evaluation workstation of claim 5, wherein the transform is a blur, and wherein the control module is further configured to:
   modify a second image of the one or more images using the transform, wherein the second image is of the first blemish test pattern;
   determine intensity values for a first region in the modified at least one image and the modified second image;
   determine intensity values for regions adjacent to the first region in the modified at least one image and the modified second image;

determine, for the modified at least one image and for the second image, that differences in the intensity value for the first region and intensity values for the adjacent regions are greater than some threshold value; and determine the existence of a blemish at the coordinates of the first region based on the determined differences in the intensity values for the first region and the adjacent regions being greater than some threshold value.

7. The optical evaluation workstation of claim 5, wherein the control module is further configured to:

modify a second image of the one or more images using the transform, wherein the second image is of a second blemish test pattern, of the one or more blemish test patterns, the second blemish test pattern comprising a plurality of evenly distributed regions of a second color separated by a dark background, the total area of the regions in the second blemish test pattern equal to a fraction of the total area of the electronic display panel.

8. The optical evaluation workstation of claim 7, wherein the control module is further configured to:

determine intensity values for a first region in the modified at least one image and the modified second image;

determine intensity values for regions adjacent to the first region in the modified at least one image and the modified second image;

determine, for the modified at least one image, that a difference in the intensity value for the first region and the adjacent regions is greater than some threshold value for the first color;

determine, for the second image, that differences in the intensity values for the first region and the adjacent regions is greater than some threshold value for the second color; and determine the existence of a blemish at the coordinates of the first region based on the determined differences in the intensity value for the first region and the adjacent regions being greater than some threshold value for both the first color and the second color.

9. A method comprising:

receiving an eyecup assembly of a head mounted display (HMD), the eyecup assembly comprising an optics block rigidly fixed at a first distance to an electronic display panel;

instructing an electronic display panel of the eyecup assembly to display one or more test patterns;

capturing, via a camera, one or more images of one or more test patterns displayed by the electronic display panel through the optics block;

modifying at least one image of the one or more images using a transform, and determining a quality metric for the modified at least one image.

10. The method of claim 9, wherein the quality metric is measure of sharpness of the one or more images presented by the electronic display panel, the one or more test patterns includes a sharpness test pattern, the transform is a fast Fourier transform (FFT), and determining a quality metric for the modified at least one image comprises:

determining a sharpness of the at least one image based on frequencies indicated in the one or more images modified using the FFT.

11. The method of claim 10, wherein the sharpness test pattern includes a background of a background color and a plurality of parallel lines of a color different than the background color, the plurality of lines traversing the image in a first direction.

12. The method of claim 9, wherein the quality metric is a measure of blemishes present in the one or more images, the one or more test patterns are blemish test patterns, and determining a quality metric for the modified at least one image comprises:

determining an existence of one or more blemishes on the electronic display panel based on an analysis of one or more blemish test patterns captured by the imaging sensor of the camera.

13. The method of claim 12, wherein the one or more blemish test patterns include a first blemish test pattern that comprises a plurality of evenly distributed regions of a first color separated by a dark background, the total area of the regions in the first blemish test pattern equal to a fraction of the total area of the electronic display panel.

14. The method of claim 13, wherein the transform is a blur, the method further comprising:

modifying a second image of the one or more images using the transform, wherein the second image is of the first blemish test pattern;

determining intensity values for a first region in the modified at least one image and the modified second image;

determining intensity values for regions adjacent to the first region in the modified at least one image and the modified second image;

determining, for the modified at least one image and for the second image, that differences in the intensity values for the first region and the adjacent regions are greater than some threshold value; and determining the existence of a blemish at the coordinates of the first region based on the determined differences in the intensity value for the first region and the adjacent regions being greater than some threshold value.

15. The optical evaluation workstation of claim 13, the method further comprising:

modifying a second image of the one or more images using the transform, wherein the second image is of a second blemish test pattern, of the one or more blemish test patterns, the second blemish test pattern comprising a plurality of evenly distributed regions of a second color separated by a dark background, the total area of the regions in the second blemish test pattern equal to a fraction of the total area of the electronic display panel.

16. The method of claim 15, the method further comprising:

determining intensity values for a first region in the modified at least one image and the modified second image;

determining intensity values for regions adjacent to the first region in the modified at least one image and the modified second image;

determining, for the modified at least one image, that a difference in the intensity value for the first region and the adjacent regions is greater than some threshold value for the first color;

determining, for the second image, that differences in the intensity values for the first region and the adjacent regions are greater than some threshold value for the second color; and determining the existence of a blemish at the coordinates of the first region based on the determined differences in the intensity value for the first region and the adjacent regions being greater than some threshold value for both the first color and the second color.

17. An optical evaluation workstation comprising:
an eyecup assembly feeder configured to receive an eyecup assembly of a head mounted display (HMD), the eyecup assembly comprising an optics block rigidly fixed at a first distance to an electronic display panel, and the electronic display panel is presenting one or more test patterns;
a camera configured to capture one or more images of the one or more test patterns presented by the electronic display panel through the optics block, the camera positioned at an exit pupil of the eyecup assembly; and
a control module configured to:
modify at least one image of the one or more images using a transform, and
determine a quality metric for the modified at least one image, the quality metric selected from a group consisting of a measure of sharpness of the one or more images presented by the electronic display panel, and a measure of blemishes present in the one or more images.

18. The optical evaluation workstation of claim 17, wherein the quality metric is the measure of sharpness of the one or more images presented by the electronic display panel, the one or more test patterns includes a sharpness test pattern, the transform is a fast Fourier transform (FFT), and the control module is further configured to:
determine a sharpness of the at least one image based on frequencies indicated in the one or more images modified using the FFT.

19. The optical evaluation workstation of claim 17, wherein the one or more blemish test patterns include a first blemish test pattern that comprises a plurality of evenly distributed regions of a first color separated by a dark background, the total area of the regions in the first blemish test pattern equal to a fraction of the total area of the electronic display panel, wherein the transform is a blur, and wherein the control module is further configured to:
modify a second image of the one or more images using the transform, wherein the second image is of the first blemish test pattern;
determine intensity values for a first region in the modified at least one image and the modified second image;
determine intensity values for regions adjacent to the first region in the modified at least one image and the modified second image;
determine, for the modified at least one image and for the second image, that differences in the intensity values for the first region and the adjacent regions are greater than some threshold value; and
determine the existence of a blemish at the coordinates of the first region based on the determined differences in the intensity value for the first region and the adjacent regions being greater than some threshold value.

20. The optical evaluation workstation of claim 17, wherein the control module is further configured to:
modify a second image of the one or more images using the transform, wherein the second image is of a second blemish test pattern, of the one or more blemish test patterns, the second blemish test pattern comprising a plurality of evenly distributed regions of a second color separated by a dark background, the total area of the regions in the second blemish test pattern equal to a fraction of the total area of the electronic display panel;
determine intensity values for a first region in the modified at least one image and the modified second image;
determine intensity values for regions adjacent to the first region in the modified at least one image and the modified second image;
determine, for the modified at least one image, that differences in the intensity values for the first region and the adjacent regions are greater than some threshold value for the first color; and
determine, for the second image, that differences in the intensity values for the first region and the adjacent regions are greater than some threshold value for the second color; and
determine the existence of a blemish at the coordinates of the first region based on the determined differences in the intensity value for the first region and the adjacent regions being greater than some threshold value for both the first color and the second color.

* * * * *